(12) United States Patent
Schlüssel

(10) Patent No.: US 12,220,781 B2
(45) Date of Patent: Feb. 11, 2025

(54) RECLAMPING DEVICE AND METHOD FOR RECLAMPING A WORKPIECE BETWEEN TWO CLAMPING DEVICES

(71) Applicant: GRESSEL AG, Aadorf (CH)

(72) Inventor: Marcel Schlüssel, Bassersdorf (CH)

(73) Assignee: GRESSEL AG, Aadorf (CH)

( * ) Notice: Subject to any disclaimer, the term of this patent is extended or adjusted under 35 U.S.C. 154(b) by 411 days.

(21) Appl. No.: 17/797,186

(22) PCT Filed: Jan. 15, 2021

(86) PCT No.: PCT/EP2021/050768
§ 371 (c)(1),
(2) Date: Aug. 3, 2022

(87) PCT Pub. No.: WO2021/156038
PCT Pub. Date: Aug. 12, 2021

(65) Prior Publication Data
US 2023/0054478 A1 Feb. 23, 2023

(30) Foreign Application Priority Data
Feb. 4, 2020 (DE) ...................... 10 2020 102 787.7

(51) Int. Cl.
*B23Q 7/14* (2006.01)
*B25J 11/00* (2006.01)

(52) U.S. Cl.
CPC ............. *B23Q 7/1431* (2013.01); *B25J 11/00* (2013.01)

(58) Field of Classification Search
CPC ......... B23Q 7/1431; B23Q 41/02; B25J 11/00
See application file for complete search history.

(56) References Cited

U.S. PATENT DOCUMENTS

| 5,655,423 A | * | 8/1997 | Nishio | B23Q 7/165 |
| | | | | 82/127 |
| 8,944,730 B2 | * | 2/2015 | De Koning | B23Q 41/02 |
| | | | | 29/33 P |
| 2005/0281641 A1 | | 12/2005 | Maynard | |
| 2020/0016710 A1 | * | 1/2020 | Yoshimura | B23Q 7/047 |

(Continued)

FOREIGN PATENT DOCUMENTS

| CN | 102164708 A | 8/2011 |
| CN | 104044008 A | 9/2014 |

(Continued)

OTHER PUBLICATIONS

International Preliminary Report on Patentability, dated Jul. 28, 2022, with Written Opinion for PCT/EP2021/050768 filed Jan. 15, 2021 (English translation).

(Continued)

*Primary Examiner* — Seahee Hong
(74) *Attorney, Agent, or Firm* — Paul D. Bianco; Gary S. Winer; Fleit Intellectual Property Law

(57) ABSTRACT

A reclamping device for reclamping a workpiece between two vices has a handling device for positioning and actuating the two vices and a reclamping station which contains a carrier for holding a first vice in an accurate position. The reclamping station contains a pressure device with a pressure plunger movable relative to the carrier by an actuator for pressing the workpiece against the first vice positioned on the carrier.

14 Claims, 4 Drawing Sheets

(56) References Cited

U.S. PATENT DOCUMENTS

Figure 1:
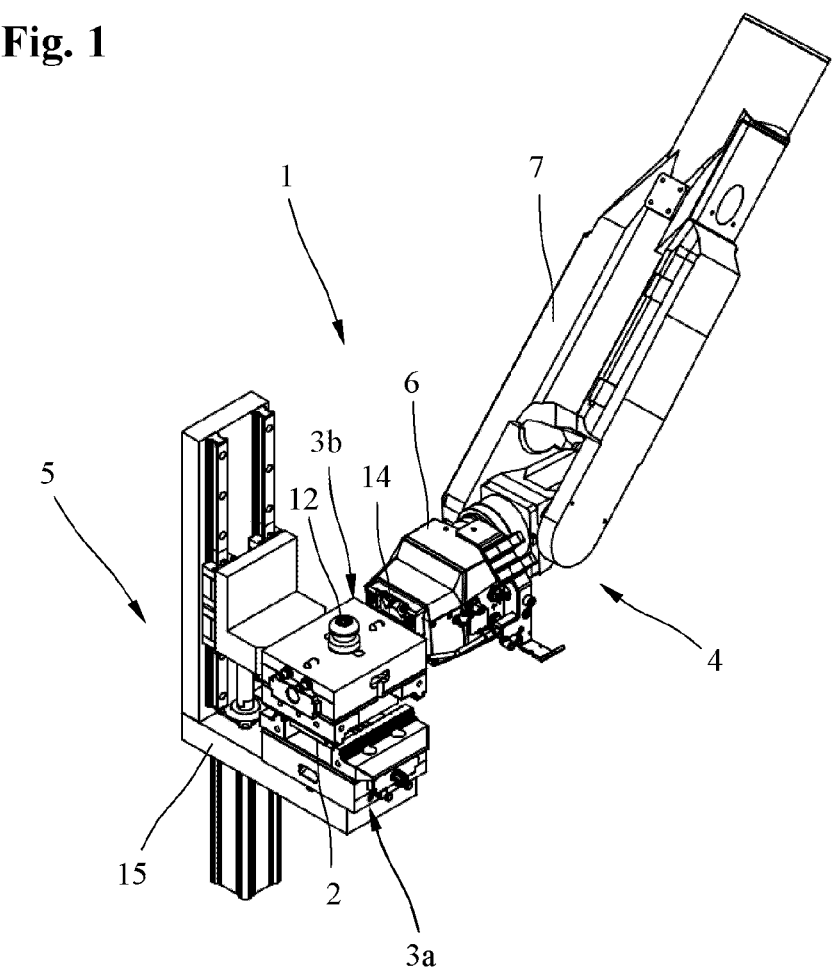

| | | | |
|---|---|---|---|
| 2020/0376671 A1* | 12/2020 | Taylor | B25J 9/1687 |
| 2021/0016404 A1 | 1/2021 | Ulrich | |

FOREIGN PATENT DOCUMENTS

| | | |
|---|---|---|
| CN | 104364051 A | 2/2015 |
| CN | 104827337 A | 8/2015 |
| CN | 206622896 U | 11/2017 |
| CN | 206967143 U | 2/2018 |
| CN | 207629704 U | 7/2018 |
| CN | 109665313 A | 4/2019 |
| DE | 102014016629 A1 | 5/2016 |
| DE | 10 2018 106 210 A1 | 9/2019 |
| JP | H11-300568 A | 11/1999 |
| JP | 2006-21274 A | 1/2006 |
| JP | 2012-504054 A | 2/2012 |
| JP | 2016-36880 A | 3/2016 |
| WO | 2010/039032 A1 | 4/2010 |
| WO | 2012/143130 A1 | 10/2012 |

OTHER PUBLICATIONS

International Search Report dated Apr. 22, 2021 for PCT/EP2021/050768 filed Jan. 15, 2021.
Written Opinion for PCT/EP2021/050768 filed Jan. 15, 2021.
Result of Examination Report for German Patent Application No. 10 2020 102 787.7 filed Feb. 4, 2020.
Japanese Office Action dated Dec. 5, 2023 for Japanese Patent Application No. 2022-546365.
Chinese First Office Action dated Dec. 5, 2023, for Chinese Application No. 202180012558.X.

* cited by examiner

RECLAMPING DEVICE AND METHOD FOR RECLAMPING A WORKPIECE BETWEEN TWO CLAMPING DEVICES

FIELD OF THE INVENTION

The invention relates to a reclamping device and a method for reclamping a workpiece between two vices.

BACKGROUND

DE 10 2018 106 210 A1 discloses a generic reclamping device. This has a first gripping and positioning device arranged at a stationary mounting location for holding a first vice. A second gripping and positioning device for holding a second vice is attached to a robot arm. To reclamp a workpiece between the two vices, the robot equipped with the second gripping and positioning device first transports an empty vice to the fixedly installed first gripping and positioning device at the stationary mounting location. After transferring the empty first vice to the stationary mounting location, the robot with the second gripping and positioning device picks up the second vice equipped with a workpiece that has already been machined and swivels it over the empty first vice with the workpiece projecting downwards so that the workpiece can be transferred from the second vice to the first vice for further machining. After the workpiece has been transferred, the robot with the second gripping and positioning device sets down the now empty second vice and can now uncouple the newly loaded first vice from the stationary mounting location and transport it to a machining position in a processing machine for further machining of the workpiece. A disadvantage of this reclamping process is that the accuracy of the positioning of the workpiece in the vice is dependent on the accuracy of the robot. Although the first vice is located at a stationary mounting location during the workpiece transfer and is thus accurately positioned, the second vice is held by the robot, so the deposit position accuracy is only as accurate as the positioning accuracy of the robot.

The invention relates to a reclamping device and a method for reclamping a workpiece between two clamping devices, in which the changing precision can be improved.

Expedient embodiments and advantageous further developments of the invention are disclosed herein.

The reclamping device according to the invention for reclamping a workpiece between two vices comprises a handling device for positioning and actuating the two vices and a reclamping station, which includes a carrier for holding a first vice in an accurate position. The reclamping station also has a pressure device with a pressure plunger movable relative to the carrier by means of an actuator for pressing the workpiece against the first vice positioned on the carrier. In the reclamping device according to the invention, the position of the workpiece during the transfer of the workpiece from one vice to the other is not determined by the handling device, but by the separate pressure device. The pressure plunger presses the workpiece precisely against the contact surfaces of the vice taking over the workpiece, regardless of the positioning accuracy of the handling device, which can significantly improve the change position. A further significant advantage of the reclamping device according to the invention is that the workpiece is held securely by the pressure device during transfer from one vice to the other, even when both vices are open. Even when the clamping jaws of both vices are open, the pressure device holds the workpiece firmly and ensures accurate positioning.

In an advantageous embodiment, the pressure device can also be used to guide the second vice, which can be moved by the handling device relative to the first vice, during its movement into the transfer position. The vice could, for example, be guided on the pressure device via a side surface of its base body, via coupling elements or a zero-point clamping element arranged on the base body of the vice. Guidance can be passive, with the handling device pressing the vice against a guiding geometry on the pressure device. Guidance could also be provided by active coupling, for example by positive connection with or without locking. The contact of the vice with the pressure device can increase the changing accuracy. With active locking, further improvement of the changing accuracy is possible.

In one possible embodiment, an alignment and positioning element can be arranged on the pressure device for connection to the second vice, which can be moved relative to the first vice by the handling device. The alignment and positioning element, which is designed, for example, as a retractable and extendable pin, can engage in a guide notch or other corresponding mating element on the base body of a vice. The positioning can also be designed to be encompassing and actively locking, so that the vice can be firmly connected to the pressure device and decoupled from the handling device.

In another expedient embodiment, the pressure plunger can have a grip profile on its side facing the carrier. This makes it possible to hold the workpiece particularly securely.

The pressure plunger can expediently be arranged on a slide which can be moved relative to the carrier. The slide can be displaceably guided by a guiding carriage and guiding rails on a guiding plate which is at right angles to the carrier. The pressure plunger can be fixedly arranged on the slide. For easier coupling or decoupling of the vice to the slide, however, the pressure plunger can also be movably arranged on the slide.

The carrier can contain a centering receptacle and/or positioning elements for holding the first vice in a positionally accurate manner. A measuring system for detecting the workpiece height during reclamping can also be arranged on the pressure device. This can improve process reliability.

The actuator of the pressure device can, for example, be a pneumatic cylinder containing a piston with an extendable and retractable piston rod. However, other actuators are also possible.

The invention also relates to a method for reclamping a workpiece between two vices, in which a first vice is first deposited in a carrier of a stationary reclamping station by means of a handling device and then a second vice is positioned by the handling device with a workpiece facing the first vice above the first vice for workpiece transfer. According to the invention, the workpiece is pressed against a contact surface on the first vice by a pressure device arranged at the reclamping station during the workpiece transfer.

Preferably, the vices are rotated 90° against each other for workpiece transfer. The jaw position, which is thus offset from one another, allows a workpiece to be completely machined on 6 sides in two clamping settings. Due to the reclamping station with the pressure device only one handling device is required for reclamping and transporting the vices.

BRIEF DESCRIPTION ON THE DRAWINGS

Figure 2:
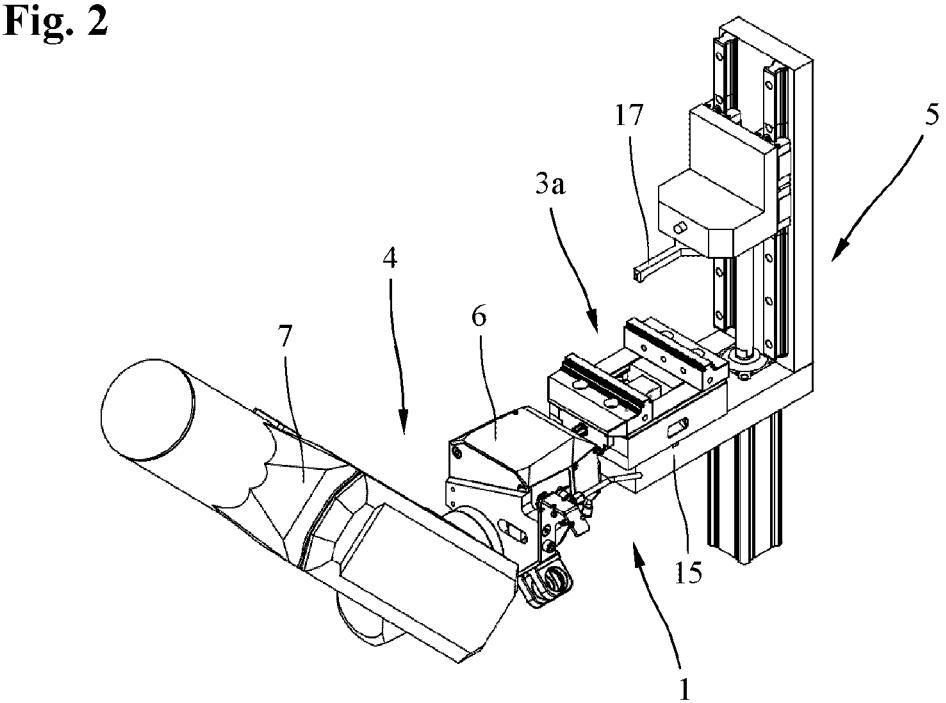
Figure 3:
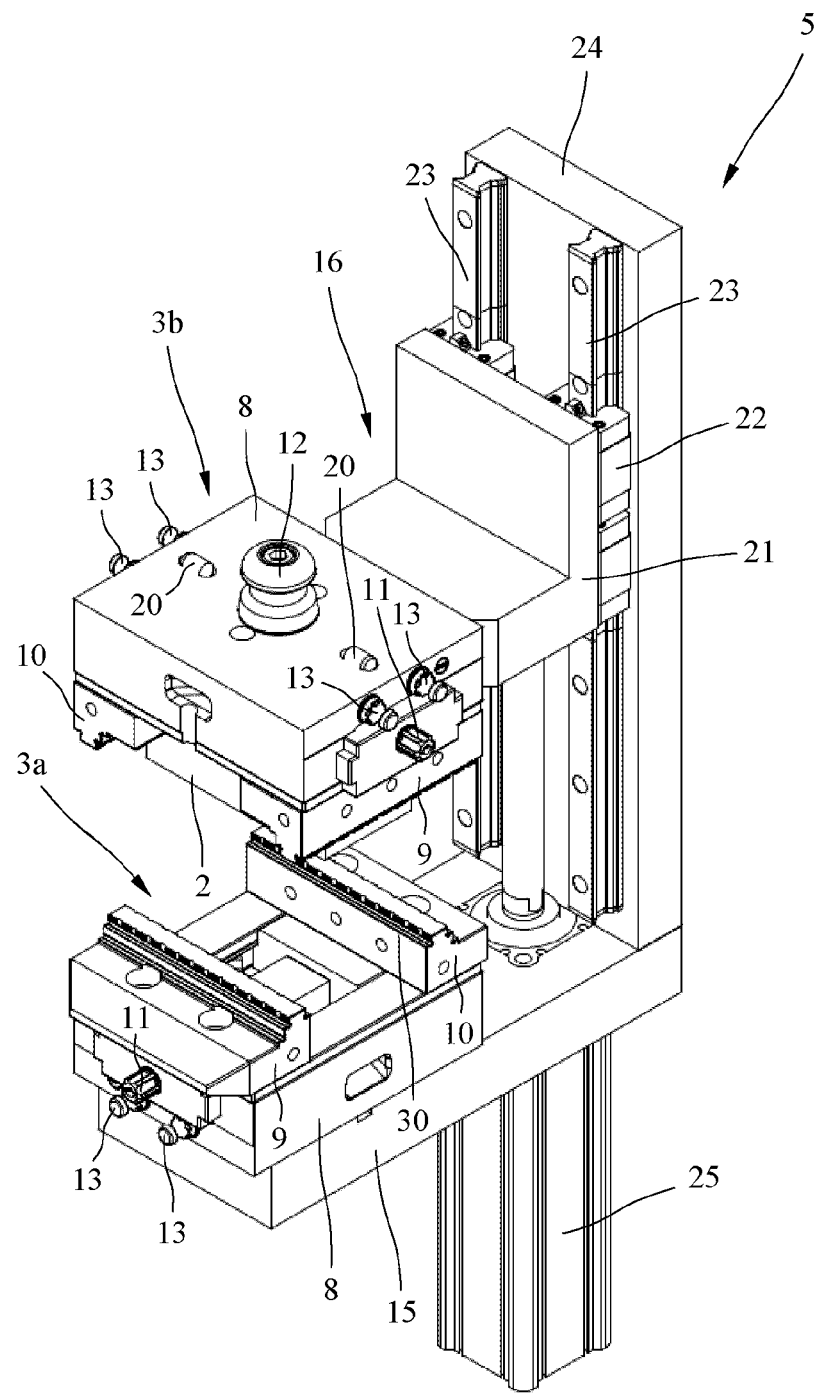
Figure 4:
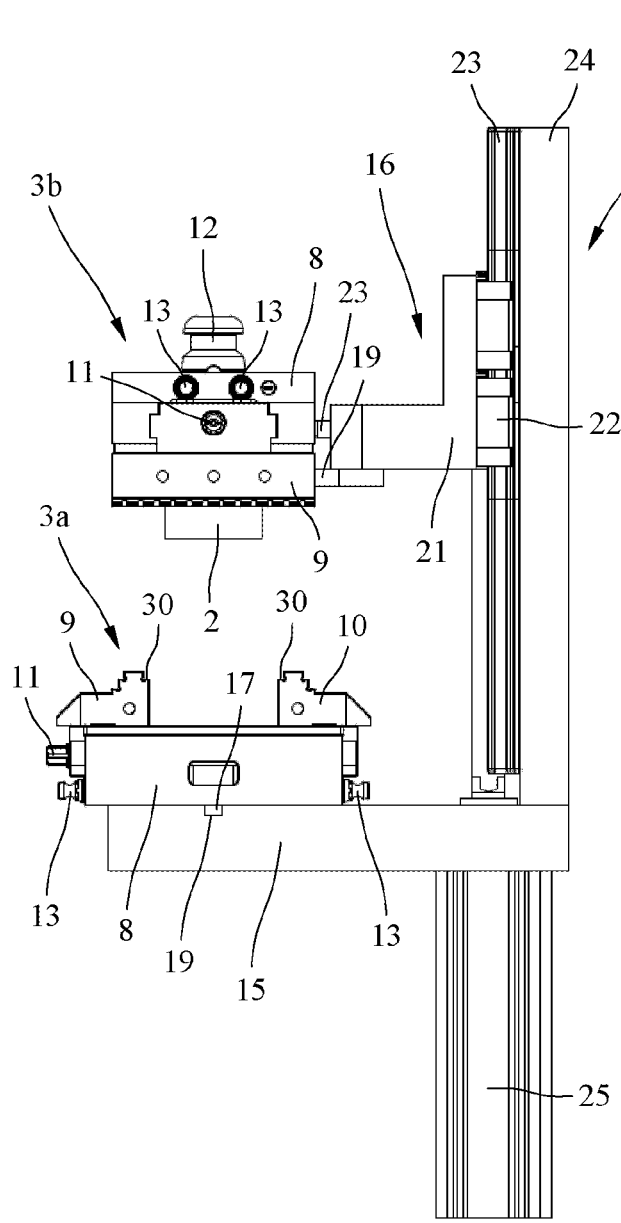
Figure 5:
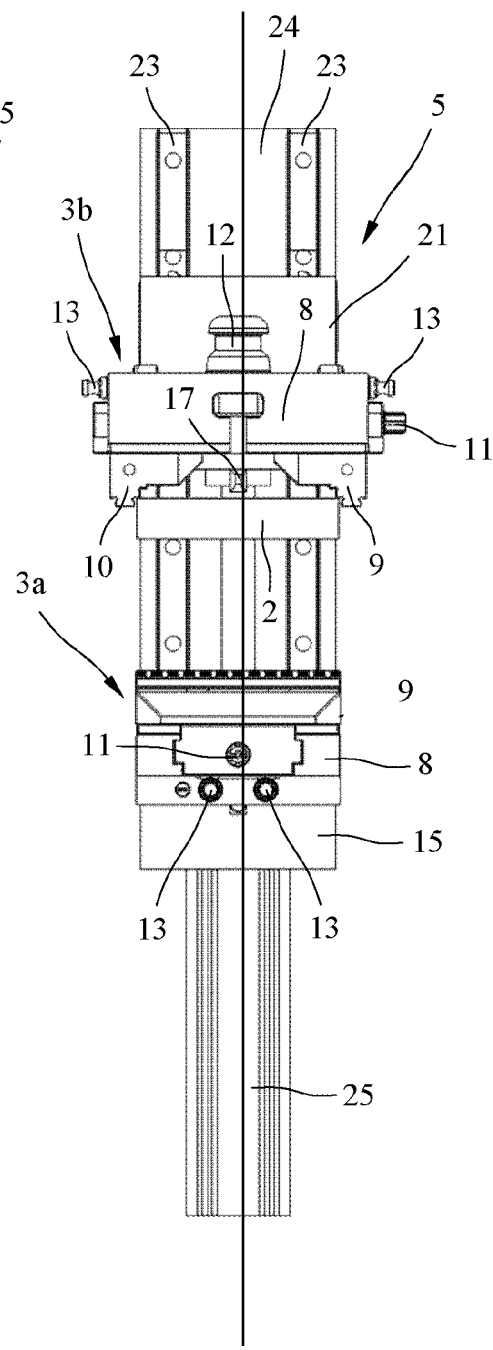
Figure 6:
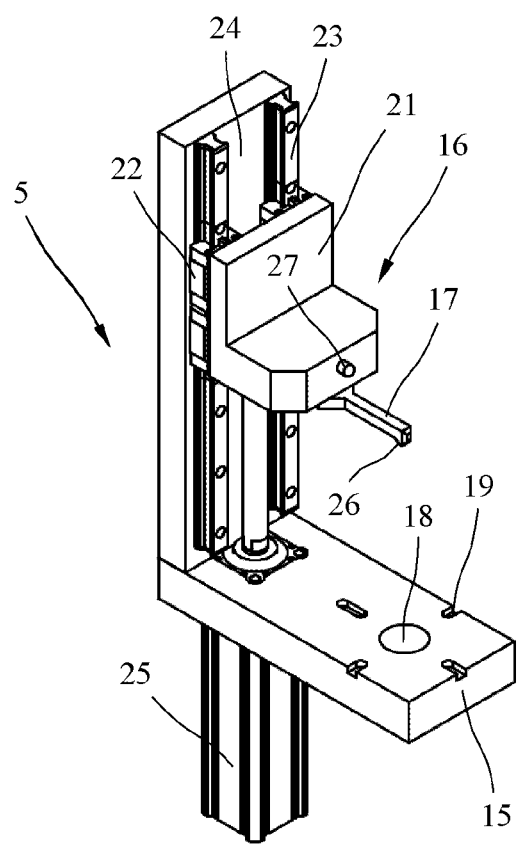

Further characteristics and advantages of the invention will be apparent from the following description of a preferred embodiment based on the drawing. It shows:

FIG. 1 a reclamping device with a reclamping station and a handling device in a first perspective view;

FIG. 2 a second perspective view of the reclamping device of FIG. 1;

FIG. 3 a reclamping station with vices in perspective view;

FIG. 4 a side view of the reclamping station of FIG. 3;

FIG. 5 a front view of the reclamping station of FIG. 3;

FIG. 6 the reclamping station of FIG. 3 without vices in perspective view and

Figure 7:
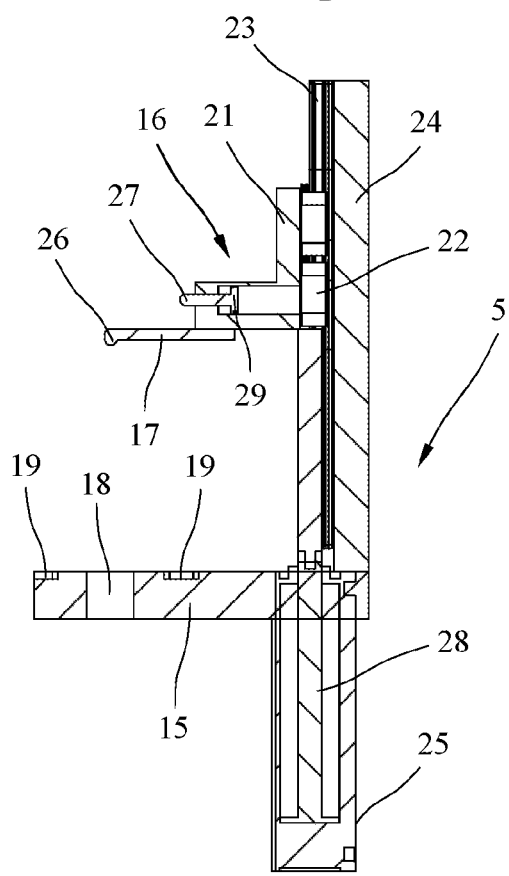

FIG. 7 a sectional side view of the reclamping station of FIG. 3 without vices.

DETAILED DESCRIPTION

FIGS. 1 and 2 show different views of a reclamping device 1 for automated reclamping of a workpiece 2 between two vices 3a and 3b. By means of such a reclamping device 1, the workpiece 2 machined in a first clamping setting can be transferred from one vice 3b to the other vice 3a in order to machine the areas not accessible in the first clamping setting in a second clamping setting. For this purpose, the reclamping device 1 comprises a handling device 4 for positioning and actuating the two vices 3a and 3b and a reclamping station 5 for holding and guiding the vices 3a and 3b in an accurate position during the reclamping process. In the embodiment shown, the handling device 4 includes a gripping and actuating unit 6 that can be coupled to the vices 3a and 3b and is arranged on a robot arm 7 of an jointed-arm robot. However, the gripping and actuating unit 6 can also be arranged on a gantry robot or a differently constructed transport or positioning system for movement in different directions. By means of the handling device 4, the vices 3a and 3b can be transported between the reclamping station 5 and a processing machine for machining a workpiece 2 clamped in the vices 3a or 3b, or to a storage facility for depositing or removal a vice 3a or 3b.

FIGS. 3 to 5 show different views of the reclamping station 5 with the two vices 3a and 3b. The vices 3a and 3b have a base body 8 and clamping jaws 9 and 10 for clamping a workpiece 2 to be machined. An outwardly projecting adjusting spindle 11 is arranged in the base body 8 for adjusting at least one of the clamping jaws 9 and 10. In the embodiment example shown, the clamping vice 3a and 3b are designed as a centric clamping device with two clamping jaws 9 and 10 that are adjustable relative to each other. However, they can also have one fixed clamping jaw and one movable clamping jaw or be designed as multiple clamping device with more than two clamping jaws. Via an external profile, here in the form of an external hexagon, at the free end of the adjusting spindle 11, which is designed as a threaded spindle, this can be rotated for mutual adjustment of the two clamping jaws 9 and 10. Instead of the external profile designed as an external hexagon, other coupling solutions can also be used, such as splined shafts, claw attachments, square connections; Torx connections or shafts with trunnion attachments.

A downwardly projecting zero point clamping element 12 is arranged on the underside of the base bodies 8. The zero point clamping element 12, which is designed here in the form of a clamping spigot, can be part of a zero point clamping system known per se for the precise positioning and holding of the vice 3a or 3b. Via this zero point clamping element 12, a clamping vice 3a or 3b can be placed in a precise position on a machine table of a processing machine provided with a corresponding receptacle and clamped by a suitable clamping device. In addition, outwardly projecting bolt-shaped coupling elements 13 are arranged on the two end faces of the base body 8 of the vices 3a and 3b for coupling with the gripping and actuating unit 6 shown in FIGS. 1 and 2.

The gripping and actuating unit 6 shown in FIGS. 1 and 2 is not only designed for gripping and transporting the vices 3a and 3b between the reclamping device 1 and a processing machine or a storage facility, but also has an integrated actuator 14 by means of which the vices 3a and 3b can be actuated for clamping or releasing. For this purpose, the actuator 14 of the gripping and actuating unit 6 contains a coupling element that can be coupled to the adjusting spindle 11 of the vices 3a and 3b for motorized closing or opening of the clamping jaws 9 and 10. When the gripping and actuating unit 6 is coupled to the vices 3a or 3b, their clamping jaws 9 and 10 can thus also be opened or closed by means of the motor. For further construction details of the gripping and actuating unit 6, reference is made to DE 10 2018 106 210 A1, the disclosure content of which is also made part of the present description.

The reclamping station 5 shown in FIGS. 6 and 7 without vices 3a and 3b contains a stationary, plate-shaped carrier 15 for receiving and holding a first vice 3a in an accurate position and a pressure device 16 with a pressure plunger 17 movable relative to the carrier 15 for pressing a workpiece 2 against the first vice 3a. A centering receptacle 18 and positioning elements 19 are provided in the plate-shaped carrier 15 for holding the clamping vice 3a in a positionally accurate manner and secured against rotation. In the embodiment shown, the positioning elements 19 are designed as grooves arranged at right angles to one another for engagement in the projections 20 shown in FIG. 3 arranged on the underside of the base body 5 of the vices 3a or 3b.

The pressure device 16 contains a slide 21 which is displaceable relative to the carrier 15 and on which the pressure plunger 17, here in the form of a cantilevered beam, is arranged. The slide 21 is displaceably guided by a guiding carriage 22 and guiding rails 23 on a guiding plate 24, which is arranged at right angles to the carrier 15 and can be held or moved along the guiding plate 24 by an actuator 25, which is here in the form of a pneumatic cylinder. According to FIG. 1, the pressure plunger 17 arranged on the slide 21 is designed in such a way that it projects above the carrier 15 in the center thereof and, as shown in FIG. 5, can engage between the two clamping jaws 9 and 10 of the second vice 3b positioned above the first vice 3a for workpiece transfer. As a result, a workpiece resting on contact surfaces of the first vice 3a can be pressed centrally against the contact surfaces of the first vice 3a by the pressure plunger 17. At its free front end, the pressure plunger 17 contains a downwardly projecting nose with a grip profile 26 for contact with the workpiece 2. The nose with the grip profile 26 is arranged in such a way that it lies centrally between the clamping jaws 9 and 10 of the vice 3a arranged on the carrier 15. This allows the workpiece 2 to be pressed centrally. A bolt-shaped alignment and positioning element 27 is also provided on the slide 21 for engagement with the vice 3b.

As can be seen from the sectional view of FIG. 7, the actuator 25, which is designed as a pneumatic cylinder, has a piston 28 with a retractable and extendable piston rod by means of which the slide 21 with the pressure plunger 17 can be held or moved in the direction of the carrier 15 or away from it. The alignment and positioning element 27 is designed as a bolt that can be retracted and extended by means of a piston 29. In the embodiment shown, the pressure plunger 17 is rigidly mounted to the slide 21 so as to project freely therefrom. Similar to the alignment and positioning element 27, however, the pressure plunger 17 can also be arranged on the slide 21 so as to be displaceable in its longitudinal direction so that it can be displaced, for example pneumatically, hydraulically or electrically, between a retracted position and an extended pressure position.

The reclamping station 5 described above can be equipped with a first vice 3a by the handling device 4 with the gripping and actuating unit 6 arranged on a robot arm 7 of an joint-arm robot according to FIG. 1. This first vice 3a does not yet contain a workpiece and has open clamping jaws 9 and 10. Via the handling device 4, the still empty first vice 3a with still open clamping jaws 9 and 10 is placed on the carrier 15 of the reclamping station 5 in such a way that the zero point clamping element 12 projecting from the underside of the base body 8 of the first vice 3a enters the centering receptacle 18 of the carrier 15 and the projections 20 on the underside of the base body 5 enter the associated groove-shaped positioning elements 19 on the upper side of the carrier 15. The geometry of the centering receptacle 18 is matched to the zero point clamping element 12 in such a way that exact alignment and positioning is achieved upon connection. As a result, a positionally accurate arrangement of the empty first vice 3a, secured against rotation, is achieved. In the embodiment shown, the first vice 3a is only positively connected to the carrier 15. Optionally, the vice 3a could also be locked in the carrier 15. Blow holes or cleaning holes could also be arranged on the carrier 15 for supplying blow air. This allows swarf or other contaminants to be removed from the contact area between the carrier 15 and the first vice 3a before connection.

When the reclamping station 5 is loaded with the still empty first vice 3a, the clamping jaws 9 and 10 of the vice 3a are set to the open position by the actuator 14 integrated in the gripping and actuating unit 6 via the adjusting spindle 11. The data on the required opening width can be transmitted to the gripping and actuating unit 6 by a process or machine control system. Based on this data, the clamping jaws 9 and 10 are adjusted to the required opening position via the adjusting spindle 11.

Subsequently, a second vice 3b with a workpiece 2 clamped therein, the workpiece 2 already machined on one side, can be positioned from above over the still empty first vice 3a via the handling device 4 as shown in FIG. 2, which is uncoupled again from the first vice 3a, in a position reversed relative to the first vice 3a, i.e. with the workpiece 2 projecting downward and the zero point clamping element 12 projecting upward, in order to transfer the workpiece 2 from the second vice 3b to the first vice 3a. For this purpose, the second vice 3b is first brought into contact with the slide 21 of the pressure device 16 via the handling device 4 and then moved together with the slide 21 in the direction of the carrier 15 towards the first vice 3a. The second vice 3b is positioned on the slide 21 of the pressure device 16 in such a way that the pressure plunger 17 as shown in FIG. 5 can enter the opening between the clamping jaws 9 and 10, the base body 5 and the workpiece 2 on the second vice 3b.

By contact of the second vice 3b with the slide 21, an exact alignment of the second vice 3b with respect to the first vice 3a and, in addition, an exact guidance of the second vice 3b during its movement in the direction of the first vice 3a can be achieved. In the embodiment example shown in the drawing, the second vice 3b is positioned against the slide 21 by means of the bolt-shaped alignment and positioning element 27, which engages in a guide notch on the side surface of the base body 8 of the second vice 3b facing the slide 21. The bolt-shaped alignment and positioning element 27 can be extended to different extents via the piston 29, so that vices with base bodies 8 of different widths can be positioned precisely centrally over the vice 3a. The second vice 3b can be guided only on the slide 21 of the pressure device 16 via the alignment and positioning element 27 or other coupling elements. However, it can also be guided via other coupling elements arranged on the end face or base side and corresponding counter elements or actively coupled to the slide 21 and thereby held on the latter.

It is also possible that the additional guiding and positioning of the second vice 3b is completely dispensed with and the workpiece 2 is pressed into the first vice 3a only with the pressure plunger 17 without additional guiding or coupling of the second vice 3b.

To transfer the workpiece 2, the second vice 3b is moved by the handling device 4 from a positioning position shown in FIG. 3 to a transfer position shown in FIG. 1. When the second vice 3b is moved into the transfer position, the slide 21 of the pressure device 16 is also carried along via the pressure plunger 17 or the coupling. Until the transfer position is reached, the piston 28 of the actuator 25 can be unpressurized or only lightly pressurized with compressed air in the extension direction, so that the piston rod offers only slight resistance to the movement of the slide 21 in the direction of the carrier 15.

After reaching the transfer position, the piston 28 is pressurized in the entering direction so that the pressure plunger 17 presses the workpiece 2 against a contact surface on the still open first vice 3a. The contact surface can be the contact surfaces 30 on the stepped clamping jaws 9 and 10 shown in FIG. 3, the upper side of the base body 8 or a spacer between the base body 8 and the workpiece 2.

The pressure plunger 17, which is pulled in the direction of the carrier 15 via the actuator 25, thus holds the workpiece 2 securely between the two still open clamping jaws 9 and 10 of the first vice 3a. Via the grip profile 26 on the underside of the pressure plunger 17, it can be ensured that the workpiece 2 is also held laterally in a non-slip manner.

The clamping jaws 9 and 10 of the second vice 3b can then be opened. Due to the arrangement of the pressure plunger 17 between the base body 5, the clamping jaws 9, and 10 and the workpiece 2, the second vice 3b is free after the clamping jaws have been opened and can be transported away via the handling device 4. The workpiece 2 then lies in the still open clamping jaws 9 and 10 of the first vice 3a and is fixed by the pressure plunger 17.

Then the handling device 4 with the gripping and actuating unit 6 can move to the first vice 3a and close its clamping jaws 9 and 10 after coupling the actuator 14 to the adjusting spindle 11. Since the pressure plunger 17 with its grip profile 26 holds the workpiece 2 in a positionally accurate and secure manner even when the clamping jaws 9 and 10 of the first vice 3a are closed, extremely precise positioning of the workpiece 2 within the first vice 3a is achieved.

After clamping the workpiece 2 in the first vice 3a, the slide 21 with the pressure plunger 17 can be moved up to the starting position and the first vice 3a can be returned to the machining process with the reclamped workpiece 2 to carry out further machining operations. During the entire reclamping process, the workpiece 2 is held by the pressure plunger 17 so that a high degree of accuracy and process reliability can be achieved during reclamping.

Preferably, the two clamping vices 3a and 3b are rotated 90° against each other in the transfer position. This allows the workpiece 2 to be completely machined on 6 sides in two clamping settings.

A path measuring device can be provided on the pressure plunger 17, the guiding carriage 22, the guiding rails 23 or on the actuator 25. This allows the workpiece height to be measured during reclamping and further increases process reliability.

In the embodiment described in detail above, the vice 3a intended for final machining of the workpiece is arranged on the carrier 15 of the stationary reclamping station 5 and the second vice 3b holding the already machined workpiece is positioned in reverse position, i.e. with the workpiece projecting downward, from above over the still empty vice 3a for transfer of the workpiece. It is also possible for the empty vice 3a intended for final machining of the workpiece to be positioned at the top and the further vice 3b holding the already machined workpiece to be positioned at the bottom. Instead of the vertical arrangement shown with vices arranged one above the other, a horizontal arrangement with vices arranged side by side would also be possible. In the embodiment shown, the vices are of identical design. However, the vices can also be of different design and size.

LIST OF REFERENCE SIGNS

1 Reclamping device
2 Workpiece
3a First vice
3b Second vice
4 Handling device
5 Reclamping station
6 Gripping and actuating unit
7 Robot arm
8 Base body
9 Clamping jaw
10 Clamping jaw
11 Adjusting spindle
12 Zero point clamping element
13 Coupling element
14 Actuator
15 Carrier
16 Pressure device
17 Pressure plunger
18 Centering receptacle
19 Positioning element
20 Projection
21 Slide
22 Guiding carriage
23 Guiding rail
24 Guiding plate
25 Actuator
26 Grip profile
27 Alignment and positioning element
28 Pistons
29 Pistons
30 Contact surface

The invention claimed is:

1. A reclamping device for reclamping a workpiece between two vices, the reclamping device having a handling device for positioning and actuating the two vices of the two vices and a reclamping station which contains a carrier for holding a first vice of the two vices in an accurate position, the reclamping station contains a pressure device for pressing the workpiece against the first vice positioned on the carrier wherein the pressure device contains a pressure plunger movable relative to the carrier by means of an actuator, which is designed in such a way that pressure plunger projects above the carrier in the center thereof and can engage between two clamping jaws of a second vice of the two vices positioned above the first vice for workpiece transfer.

2. The reclamping device of claim 1, wherein the pressure device is designed for guiding the second vice, and wherein the pressure device is movable relative to the first vice by the handling device.

3. The reclamping device of claim 1, wherein an alignment and positioning element is arranged on the pressure device for connection to the second vice, and wherein the alignment and positioning element is movable relative to the first vice by the handling device.

4. The reclamping device of claim 1, wherein the pressure plunger contains a grip profile on a side facing the carrier.

5. The reclamping device of claim 1, wherein the pressure plunger (17) is arranged on a slide (21) which can be moved relative to the carrier (15).

6. The reclamping device of claim 5, wherein the slide is displaceably guided via a guiding carriage and guiding rails on a guiding plate which is at right angles to the carrier.

7. The reclamping device of claim 5, wherein the pressure plunger is arranged fixed or movable in a longitudinal direction on the slide.

8. The reclamping device of claim 1, wherein the carrier contains at least one of a centering receptacle and positioning elements.

9. The reclamping device of claim 1, wherein a measuring system for detecting a height of the workpiece during reclamping is arranged on the pressure device.

10. The reclamping device of claim 1, wherein the actuator of the pressure device is designed as a pneumatic cylinder which contains a piston with an extendable and retractable piston rod.

11. A method for reclamping a workpiece between two vices, the method comprising:
depositing a first vice of the two vices in a carrier of a stationary reclamping station by means of a handling device;
positioning a second vice of the two vices by means of the handling device with ha workpiece facing the first vice above the first vice for workpiece transfer and the workpiece is pressed against a contact surface on the first vice during the workpiece transfer by a pressure device arranged at the reclamping station,
wherein the workpiece is pressed against the contact surface on the first vice during the workpiece transfer by a pressure plunger of the pressure device, which pressure plunger is movable relative to the carrier by means of an actuator, projects over the carrier in the center thereof and engages between two clamping jaws of the second vice positioned above the first vice for the workpiece transfer.

12. The method according to claim 11, wherein the first and second vices are rotated 90° relative to each other for workpiece transfer.

13. The method according to claim 11, wherein after reclamping the height of the workpiece is measured by a path measurement at the pressure device.

14. The method according to claim 11, wherein both the first and second vices are transported and actuated by the handling device.

* * * * *